United States Patent [19]

Franke et al.

[11] Patent Number: 4,489,818
[45] Date of Patent: Dec. 25, 1984

[54] CROSS-PIT CONVEYOR

[75] Inventors: Rudiger Franke, Mettmann; Aby Weiss, Monheim, both of Fed. Rep. of Germany

[73] Assignee: Mannesmann AG, Duesseldorf, Fed. Rep. of Germany

[21] Appl. No.: 471,396

[22] Filed: Mar. 2, 1983

[30] Foreign Application Priority Data

Mar. 2, 1982 [DE] Fed. Rep. of Germany ....... 3207419

[51] Int. Cl.³ ............................................ B65G 41/00
[52] U.S. Cl. .................................. 198/311; 198/314; 198/318; 198/303; 212/262; 212/265
[58] Field of Search ............... 198/303, 304, 311, 314, 198/318, 508; 414/133; 212/195, 255, 262, 265

[56] References Cited

U.S. PATENT DOCUMENTS 3,900,077 8/1975 Gee et al. ........................... 180/9.46

*Primary Examiner*—Jeffrey V. Nase
*Attorney, Agent, or Firm*—Ralf H. Siegemund

[57] ABSTRACT

Cross-pit conveyor for strip-mining operations and cooperating with one or more excavating machines includes a pair of struts and a base strut, all arranged and interconnected in a configuration constituting a horizontally oriented isosceles triangle, the struts of the pair constituting the legs and defining the principal corner of the triangle as well as a line of symmetry of the triangle; undercarriages are disposed in the corners of the triangle for movably but separately supporting the struts; a first pair of upwardly converging towers is pivotably linked to the base and the corners and a second pair of upwardly converging towers extends from the base corners in an inclined fashion: a vertical support tower extends generally upwardly from the principal corner and has its upper end connected to the ends of the second pair of converging towers; tensioning cables interconnect the towers at their respective upper ends; a boom is tensioned by cable and pivotably linked to the base strut and extends in a direction opposite that principal corner; the boom includes the main conveyor facility.

14 Claims, 5 Drawing Figures

CROSS-PIT CONVEYOR

BACKGROUND OF THE INVENTION

The present invention relates to a device for depositing dead rock (overburden) of the type produced during surface or strip mining; the devices of the type to which the invention pertains, also being known under the term "cross-pit conveyor." Equipment of the type to which the invention pertains is to be used in installations, wherein in a two-stage or multi-step operation the dead rock or overburden, situated above useful ores and minerals, are removed and prebenched so that a drag line excavating the lowest stage can be restricted to that task, the drag line depositing overburden on the other side of the pit from which the useful minerals are extracted.

Strip mining of the type to which the invention pertains increases in usefulness particularly for mining anthracite and bituminous coal, soft coal, phosphate, oil sand, oil shale, and the like. Strip mining can be expected to increase in the future.

One has to distinguish between continuous and discontinuous strip mining operations. The continuous strip mining operation is characterized by the utilization of bucket wheel excavators, conveyor belts, and depositing equipment. The dead rock or overburden situated about the useful strata is taken up by the bucket wheel excavators which are movable through caterpillar type vehicles. Known equipment, moreover, transports the overburden through conveyors around the excavation pit, and depositing equipment, likewise movable on caterpillars, deposits the overburden into those areas adjacent to the excavation pit from which the useful minerals and ores or the like have already been removed. The conveyors used for that purpose are quite long, and all parts must be movable in order to follow the progress of the strip mining operation. Investment costs for the conveyors, and particularly their maintenance, are very high.

The so-called "drag lines" with a walking mechanism have been used in the past for directly depositing the overburden on the other side of a pit, which is sometimes several kilometers long. The boom of the drag line, suitably oriented, throws the overburden onto the other side of the pit. The drag line, moreover, exposes the useful strata in the bottom of the pit and the useful minerals are excavated by a second excavating system, consisting, for example, of rope-type stripping shovels and heavy trucks for removing the excavated and useful material. The boom length of the drag line has to be sufficiently large so that the overburden can be deposited in that portion of the mine from which the useful strata have already been removed. A conventional dimension for such drag lines, usually with a walking mechanism, is characterized by a boom length of from 80 to 100 meters, i.e., in excess of 300 feet, at a content of the excavating buckets from 40 to 60 cubic meters. The digging depth of a drag line determines also the length of a working cycle and should not exceed 30 to 40 meters, depending upon the boom length.

Since the cost of mining by means of a drag line and, here particularly, the cost for removing the overburden is below he cost of other systems, it is desirable to use drag lines even in those situations where the strata thickness of the overburden is larger than the depth that can be usually handled by drag lines. Conceivably one could remove overburden in the first step by means of bucket wheel excavators and remove the thus excavated overburden by means of conveyors, running around the pit and depositing the material on the other side of the pit. In particular, the overburden so removed could be deposited on top of overburden which a second stage drag line has already deposited. Aside from a rather high cost of this method, it offers the disadvantage that these two different types of strip mining systems or subsystems require a certain "tuning," and their cooperation is, in practice, really not very flexible; very accurate, extensive, and particularly consistently realizable planning is required.

Conveyor bridges are also known for the removal of overburden which are supported in a bridge-like fashion to both sides of the strip mining pit. These bridges are highly immobile. The are also very heavy and have to be adjusted and designed in order to accommodate the particular depth and width of the various pits and portions thereof; all of these requirements render their utilization rather unwielding.

Occasionally, one uses those types of depositing equipemnt as they are known from continuous strip-mining operations, and they are used particularly with extended booms for directly depositing the overburden without an extensive conveyor belt path in between. It has to be said, however, that the boom lengths available here are insufficient, and particularly one cannot use them together with existing drag line equipment. Generally, it should be said that boom lengths of up to 200 meters, or maybe even more, are required while normal strip mining machines operate with 60-to-100-meter boom lengths while cross-pit conveyors as they are used presently have a boom length of from 130 to 150 meters.

If one would extend the known cross-pit conveyors to accommodate a boom length of 200 meters or more under utilization of currently practiced construction techniques, one would obtain an extremely expensive piece of equipment which is difficult to operate and to install, and the operation would be rather time-consuming. They hardly could be dismantled for moving to another mining site for being reused which, of course, is a necessity for economic reasons. This deficiency is due to the fact that heretofore employed construction principles for cross-pit conveyors are characterized by an upper structure with booms and a rather long and elevated counterboom carrying a counterweight for compensating the long extension and the mass of the principal conveyor boom. Moreover, a turning connection is provided for pivoting the entire upper structure relative to a lower support structure. The lower structure is usually of a triangular configuration and the corner points are all affixed to a caterpillar vehicle. The overburden is transported through a particular bridge to the center of rotation of the device. The bridge is additionally supported at its other outer end by another caterpillar vehicle.

The rotating or turning connection as between the upper and lower construction portion of the cross-pit conveyor is by and in itself very expensive. Many construction parts are under a heavy bending load and a solid-wall-type carrier construction is needed, which by and in itself is very heavy. Moreover, the upper portion should be amenable to turning without or very little constraint as it is necessary for normal continuous strip mining. This, in turn, leads to a very complicated and expensive carrier sytem for the upper construction portion of the cross-pit conveyor. The center of gravity of such equipment is situated very high, which is not of advantage from a stability point of view.

DESCRIPTION OF THE INVENTION

It is an object of the present invention to provide a new and improved system for cross-pit conveying which avoids the aforementioned drawbacks and problems and which, in cooperation with drag lines, can be used for directly removing and depositing other strata and which, in relation to the necessary conveyor length, is still comparatively easy to transport.

It is a particular object of the present invention to provide a new and improvec cross-pit conveyor for use in multistage discontinuous strip ming and to be used in cooperation with a drag line removing the lowest stage of overburden above the useful ore strata, the drag line depositing the overburden directly on the other side of the pit which opens up the useful strata.

In accordance with the preferred embodiments of the present invention, it is suggested to provide a cross-pit conveyor with three rolling or walking mechanisms being arranged in the corners of a support frame having struts which establish an isosceles triangle, and a boom is pivotally arranged in the plane which runs in a plane that includes the axis of symmetry of the said triangle, whereby the principal corner of the isosceles triangle, at the point of symmetry, is situated opposite the extension of the boom, and wherein accordingly the strut facing that particular corner is not only the basis for the said triangle, but each end is a support point of two pairs of diverging support towers which, as far as the two ends of each pair is concerned, converge toward each other in upper directions; the towers of each pair are of equal lengths. The principal corner of the triangle corner is also the base of an upwardly extending tower which, at its upper end, joins two of the upwardly oriented support towers, while a tension member connects the point of common junction with the connection between the other pair of support towers. Moreover, the boom is tensioned with respect to the said tower structure by suitable cables.

The inventive construction offers the advantage of derrick cranes with triangular support bases. A derrick is characterized by particularly simple construction features because it does not include components subject to bending. All of the load bearing parts of the inventive structure are oriented to each other so that the reaction of forces occur in triangles having relatively large corner angles. It was a surprising result of the invention that the demands of a cross-pit conveyor can be met much better if, so to speak, the construction of a derrick is turned upside down, i.e., the boom is not connected to a vertical standing tower, but on the opposite side. This way, one establishes rather broad bases in order to tension the boom by means of tension cables such that the boom cross section itself can be selected to be quite small, which, of course, is highly beneficial as far as overall length and transportable mass is concerned.

The inventive device may advantageously be provided with three caterpillars or walking mechanisms (i.e., undercarriage means). During operation, two of these undercarriages may be situated right at a cliff, and the elevational adjustment of the boom may be carried out through the support towers being located directly above these carriage means. The rearwardly oriented force component compensates at least partially the component of the strut force acting from the rear. The thus provided support structure in which struts and towers are exlusively under tension or compression (and not bending) constitutes, therefore, an optimum in strength attainable by a very low weight.

In furtherance of the invention, the boom is tensioned in various directions, all runnin basically in a plane which runs transversely through the base of the (horizontal) triangle constituting the basic support. This way, one increases the area and range for tension support which is quite important in view of transverse forces resulting, for example, from wind acting on the boom.

In accordance with another feature of the invention, it is suggested that the one pair of support towers, to which are connected the boom-tensioning cable, is by itself provided for variable inclination. This tower pair is tilted by using the above-mentioned tension member constructed, for example, as a tackle and block configuration. The block and tackle pivots the pair of support towers facing the boom, and due to the provision of tensioning cable, the boom is pivoted therewith in a vertical plane.

In furtherance of the invention, it is suggested to terminate the cable being arranged in the transverse support plane of tensioning, in points coinciding with the axis of pivoting of the boom. This way, one will not incur changes in length in the tensioning cable upon pivoting of the boom so that the triangle formed by the boom-tensioning cable, the immediate pair of pivotable support towers and the pivotable boom remain invariant upon pivoting.

It is of particular advantage to provide a compression support within the plane of symmetry of the triangle constituting the basic support and running from the principal corner of that triangle to the center of the strut constituting the base of the isosceles triangle. This way, forces set up by the boom in the plane of symmetry of the triangle are reacted into compression support, and any bending of the transverse (base-defining) strut is avoided. In other words, certain forces exerted by the boom upon the support are reacted purely as compression forces into this central support element and, thereby, relieves the transverse strut; forming one side of the triangle, from bending.

In accordance with another feature of the invention, this particular support strut is of a box-like configuration and includes in its (hollow) interior electrical equipment which may be subject to separate installation. This way, a convenient place is provided for and as a protective mounting structure for sensitive electrical equipment. In addition, one can provide the electrical control circuitry for the entire cross-pit conveyor as a selfcontained unit which is simply stored in that boxlike support element. Moreover, during transport, the sensitive electrical equipment can be removed into a separate and a more careful transport operation.

In accordance with another feature of the invention, the main conveyor belt running into and along the boom is continued into the central support triangle; and here it is of course of advantage to use the box-like support strut as a upport element for the conveyor. The boom conveyor facility may include, particularly in the area of the supporting triangle, an interposed acceleration section by means of which different feeder rates can be rendered more uniform. The acceleration section permits distribution of the material upon a'larger or shorter length conveyor belt. Retardation of material will increase the density of the material per unit length of the principal conveyor belt facility in the boom. In addition, this acceleration and retarding facility may be integrated with a scale portion and weighing facility in order to control the spped of the accelerator-retarding conveyor in dependence upon the load per unit length on the conveyor. In particular, the scale measures the feeder stream moved onto the accelerating conveyor. If a certain limit is exceeded, then the belt speed is reduced until the permissible load-per-unit length on the boom conveyor is no longer exceeded. The scale indicates the conveyor throughput of the accelerator belt, and the measured weight may be indicated to the operator in a suitable compartment.

In accordance with another feature of the invention, it is suggested that the boom conveyor and/or the accelerating conveyor are even extended beyond the principal corner of the triangle, in the direction opposite to the boom, and to provide overhanging chute means permitting loading of the boom conveyor, for example, from a large-scale bucket wheel excavator, operating at a higher level. Feed flow homogenization by way of the controled acceleration device may be interposed if that is needed.

In furtherance of the invention, it is suggested that the principal corner point of the support triangle defines generally the area for connecting a feed conveyor to the crosspit conveyor, particularly, because the boom conveyor runs along the center axis of symmetry which ends in that particular corner facing away from the general extension of the boom. This particular feed conveyor is to be pivoted on a vertical axis running through a point slightly offset from that principal corner point in relation to the extension of the boom. The latter conveyor may well serve as the principal feeder for cooperating with other excavating equipment, including compact bucket wheel excavators, large-scale bucket wheel excavator, and other excavating and delivery equipment, including a feed flow homogenizer or equalizer.

In order to increase the throughput and to make more efficient use of the cross-belt conveyor, a second feeder conveyor, possibly a longer one, may be pivotably linked to the same area but at a higher level for conveniently cooperating with another excavator, removing overburden from a different level. Neither the excavators nor the delivery and feeder equipment will interfer with the respective other ones. The points of depositing material onto the principal conveyor by means of the several feeder convedyors should be staggered along the center axis of symmetry of the system.

The same area, particularly the extended point of pivoting of the principal feeder conveyor, may serve also for fixing a counterweight for purposes of balancing the boom extension. This weight will, therefore, be disposed beyond the principal corner of the isosceles triangle and is, therefore, displaced from the center of gravity as well as situated at a lower level, which is highly beneficial for the stability, on one hand, while it permits larger boom extensions, on the other hand.

This then leads to the basic aspect of the invention, its advantages. The construction permits considerable longer boom lengths as compared with known construction as a result of the several construction features as outlined above. Most importantly, however, any turret-like turning elements are avoided, such known elements have considerable weight on their own and present, of course, considerable difficulties as far as supporting the turning motion is concerned. The corner points of the support triangle may serve as points of mounting undercarriages, caterpillars, or walking mechanisms, which are turnable so that the cross-pit conveyor is movable and displaceable in any direction, including particularly the direction transverse to the boom extension.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof, will be better understood from the following description taken in connection with the accompanying drawings, in which

Proceeding now to the detailed description of the drawings, FIG. 1 illustrates an example for an inventive cross-pit conveyor being movable by means of three pairs of caterillar vehicles in representation of undercarriage arrangements 2a, 2b, and 2c. Details of the cross-pit conveyor 1 will be described shortly. In general, the conveyor 1 operates with the assistance of equipment for the two-step or two-stage removal of overburden above the stratum 4 of useful ore. In particular, the cross-pit conveyor 1 cooperates with a drag line excavator 3 which removes the overburden stratum immediately on top of the ore and mineral stratum 4, thereby creating a ditch or pit 4a and the overburden excavated by drag line 3 is deposited in a pile 4b. The pile of removed overburden 4b is located on the other side of the ditch or pit 4a.

Figure 1:
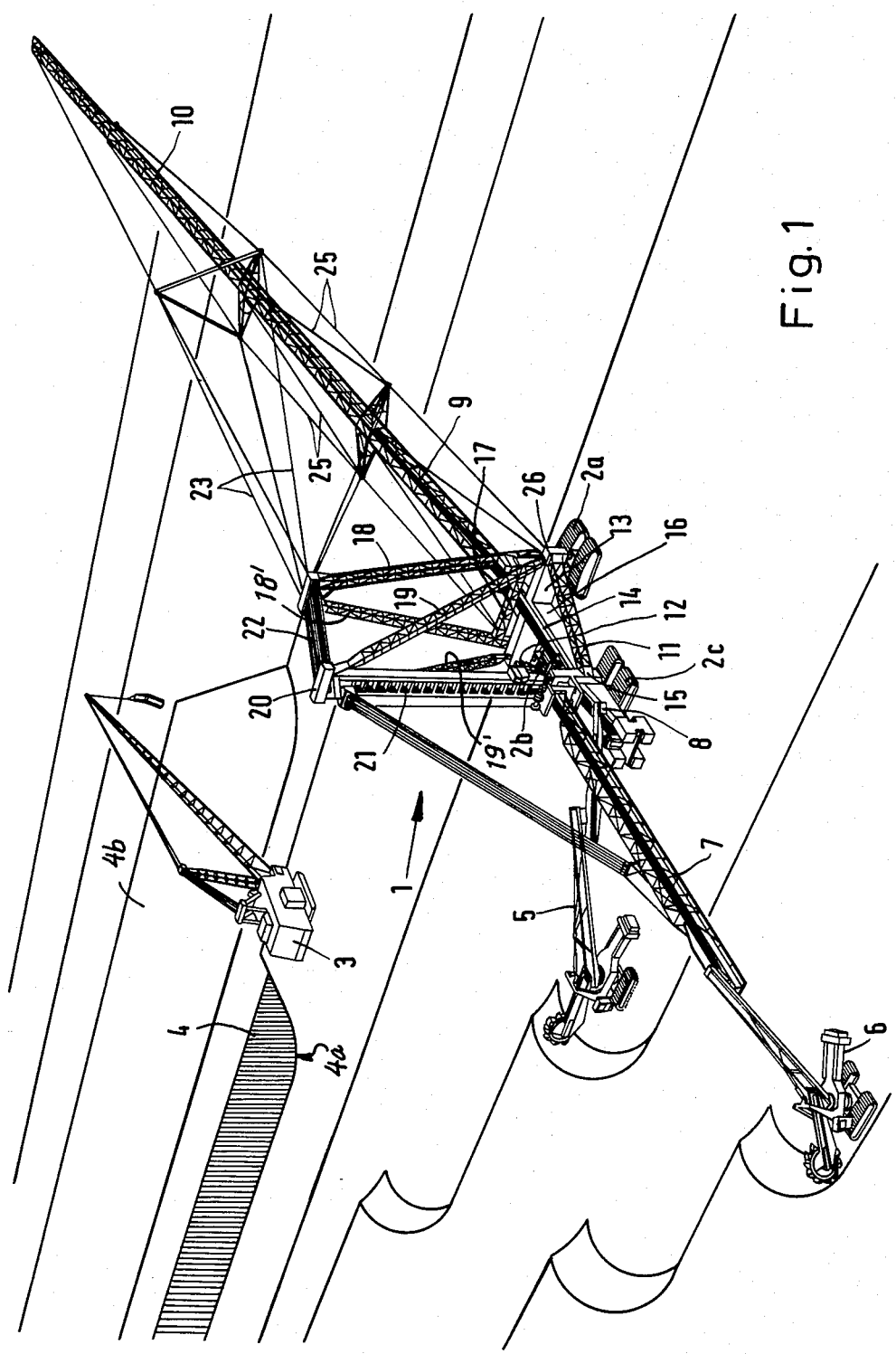
FIG. 1 is a cross-pit conveyor in accordance with the preferred embodiment of the present invention for practicing the best mode thereof in conjunction with a two-step removal of overburden in a strip-mining operation.

The cross-pit conveyor 1 shown in FIG. 1 cooperates with two compact bucket wheel excavators 5 and 6 which work in different layers and on different steps or stages of the strip-mining operation. The two bucket wheel excavators transfer the removed overburden to conveyor facilities 7 and 8 which constitutes feeder conveyors depositing the respective material onto the principal conveyor 9 which runs into and along the boom 10 of the cross-pit conveyorl to the very end of the boom. By means of the boom 10 and the conveyor belt 9, the removed overburden material is deposited at a location which is situated at the upper right-hand corner of FIG. 1.

As can be seen in particular from FIG. 1, three undercarriages 2a, 2b, and 2c are mounted and siuated in the corner points of a support frame defined by and including struts 11, 12, and 13, which are arranged in a horizontally oriented isosceles triangle which constitutes the basic support structure of the inventive device. The strut 13 constitutes the base, and the struts 11 and 12 are symmetical legs of the triangle, both originating in one particular and principal corner point 15 of that triangle.

The ends of the base 13 can be deemed to define the two other corner points of the triangle.

The boom 10 runs and extends through a center line of symmetry of the triangle, whereby the conveyor 9 extends along that line of symmetry. The plane of symmetry is defined by a plane that extends at right angles to base strut 13 and runs through the principal corner 15 of the triangle. Moreover, the corner point 15 is situated generally at an orientation, as far as the triangle is concerned, which faces away from the extension of the boom 10.

A particular box-like support 16 is provided within this vertical plane, support 16 is also a strut and links the center of strut 13 with corner 15. The support 16 is of a box-like construction and contains, for example, the electrical equipment of the entire device. The box carrier 16 receives compression forces from the point of articulation 17 of the boom 10 into the system and relieves struts 13 from bending forces. Note, that the hinge point 17 is directly opposite box strut 16 where connected to strut 13.

The corners as defined at the ends of struts 13 serve in each instance as bases for two support towers 18 and 19 as to one corner, and 18' and 19' as to the other corner. The two towers 18 and 18' converge in upper direction, so do the two towers 19 and 19', while on the other hand the towers 18 and 19 diverge in upper direction which is also true for the two towers 18' and 19'.

The two towers 19 and 19' are interconnected at 20 to each other, and the interconnect structure is, in turn, connected to a vertical support strut and tower 21, extending in upward direction from the corner point 15. A similar structure interconnects the top of the two converging towers 18 and 18'. The two towers 18 and 18', moreover, are pivotable about the horizontal axis of and in the strut 13. A block and tackle arrangement 22 interconnects the top of the two towers 18 and 18'; and the connect element 20. Cables 23, on the other hand, connect the boom 10 and various parts to that top structure of the towers 18 and 18'. Therefore, the block and tackle 22 are provided to adjust the tension of the cable 23 holding the boom in the particular position of inclination. Upon operating block and tackle 22 for tilting towers 18, 18' toward connect structure 20, boom 10 will be raised.

Figure 2:
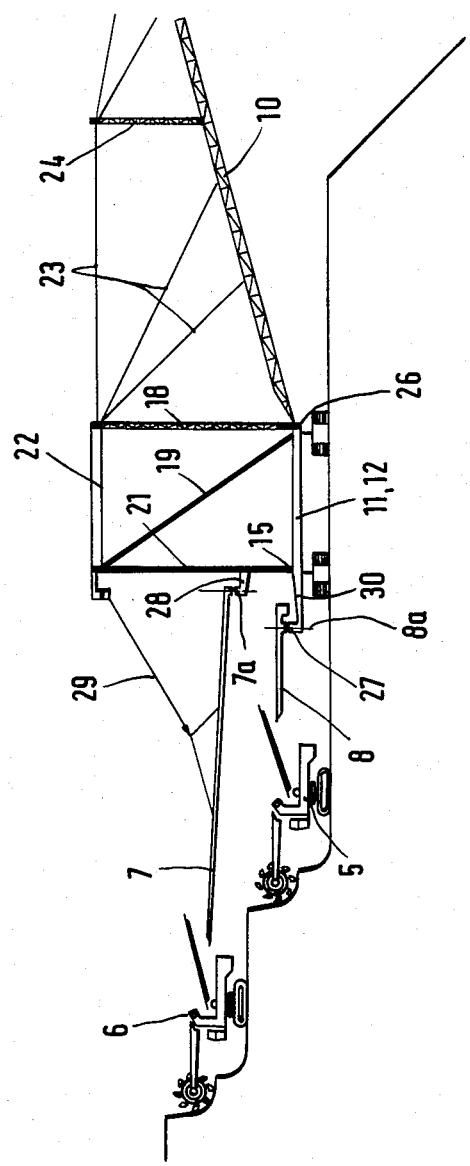
FIG. 2 illustrates the cross-pit conveyor as shown in FIG. 1 but in a more schematic manner.

The overall construction and arrangement is somewhat schematically illustrated in FIG. 2 which, however, shows certain structural features of the system in greater detail. This includes, in particular, a connection of the tension cables 23 to the top of the towers 18, 18', whereby a support strut structure 24 is disposed along the boom 10 in order to run some of the cables 23 to particular positions on the boom 10 more to the left of the drawing of FIG. 2.

The boom 10 is constructed as a lattice-type frame or grid work; so are other components such as struts 11 and 12, and so were 18, 18', 19, 19'. The boom 10 may support a track on which runs a maintenance carriage. This obviates the need for separate gangways. Such gangways are easily soiled which, in turn, constitutes an additional load on the boom. On the other hand, the rails may constitute a part of the boom structure.

As seen in greater detail in FIG. 1, additional cables 25 are connected in a plane that includes the boom and the axis of pivoting of the boom 10. These cables 25 extend to both sides of the boom and run to fastening points 26 being located generally in the corner points of the triangle at the ends of the strut 13. Preferably, these fastening points 26 are situated directly on the pivot axis of the boom 10 which also coincides with the pivot axis of the two towers 18 and 18'. This way, it is ensured that any change in inclination of the towers 18, corresponding to a change in inclination of boom 10, does not change the length of cables 23 because the triangles formed by the cables 23 the boom 10, and the towers 18, 18', remain invariant.

The two feed conveyor booms 7 and 8 are pivotable respectively about vertical axes 7a and 8a. The connection runs particularly to the vertical support tower 21 extending from the corner 15 of the basic support triangle. The feeder boom conveyors 7 and 8 are, therefore, orientable in different directions in relation, basically, to the corner 15 of the support triangle, and they are operable in different levels.

The conveyors 7 and 8 receive excavated overburden from the bucket excavators 5 and 6 and deposit the material upon the boom conveyor belt 9. Delivery equipments 27 and 28 is provided for the immediate feeder connection between the booms 7 and 8, on one hand, and the conveyor 9, on the other hand. It will be recalled that the central conveyor 9 runs in the center line of symmetry of the isosceles support triangle. The conveyor 9 is not necessarily a single, endless belt unit, but may include serially operating sections. Therefore, the portion of conveyor 9 within the triangle is constructed as an accelerating belt with integrated belt scale, wherein different conveyor speeds of the belt can be controlled and adjusted in dependence upon the load and quantity of the removed and conveyed overburden. The objective is to equalize the load on the boom 10 and provide a uniform load-per-conveyor (9) unit length independent from variable or intermittent feed rate by the excavators.

The feeder boom conveyor 7 is suspended by means of a cable 29 under vertical support tower 21, as illustrated particularly in FIG. 2. The conveyor and feeder boom 8 is supported in an extension of the triangle base frame, beyond the corner point 15 of that triangle. The extension of the support frame is designated by the numeral 30 and may be constructed as a counterweight for the boom 10. The counterweight is situated quite low, so that the center of gravity of the device as a whole is low accordingly.

The compact bucket wheel excavators 5 and 6 are also shown in FIG. 2, and they are depicted particularly in an operating position with regard to the feeder conveyors 7 and 8. It should be said that in FIG. 2, they are illustrated as having been projected into the plane of the drawing which is the plane of symmetry of the triangle and of the boom, and the excavator 6 is located approximately in that plane. The excavator 5 is shown in FIG. 1 as being laterally displaced.

Figure 3:
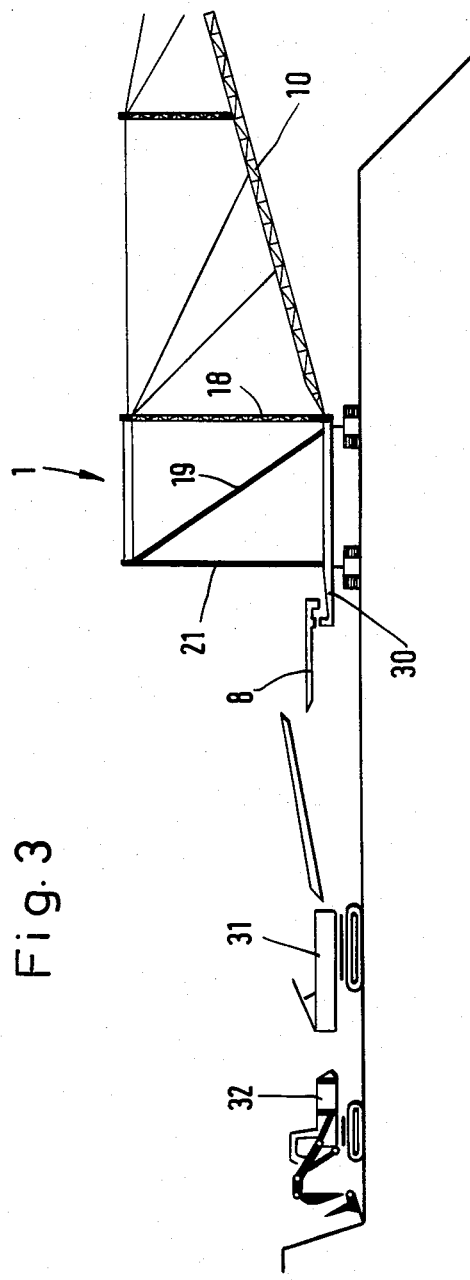
FIG. 3 illustrates the cooperation between the cross-pit conveyor shownin in FIGS. 1 and 2 with various pieces of mining equipment.

The arrangement shown in FIG. 3 includes basically the same cross-pit conveyor 1. However, one of the feeder conveyors has been omitted. There is then provided a single feeder base. This particular feeder receives material from a temporary storage facility 31 which, in turn, cooperates with a dredging and excavating device 32. This particular figure merely demonstrates that the inventive cross-pit conveyor is not limited for cooperation with compact bucket wheel excavators.

Figure 4:
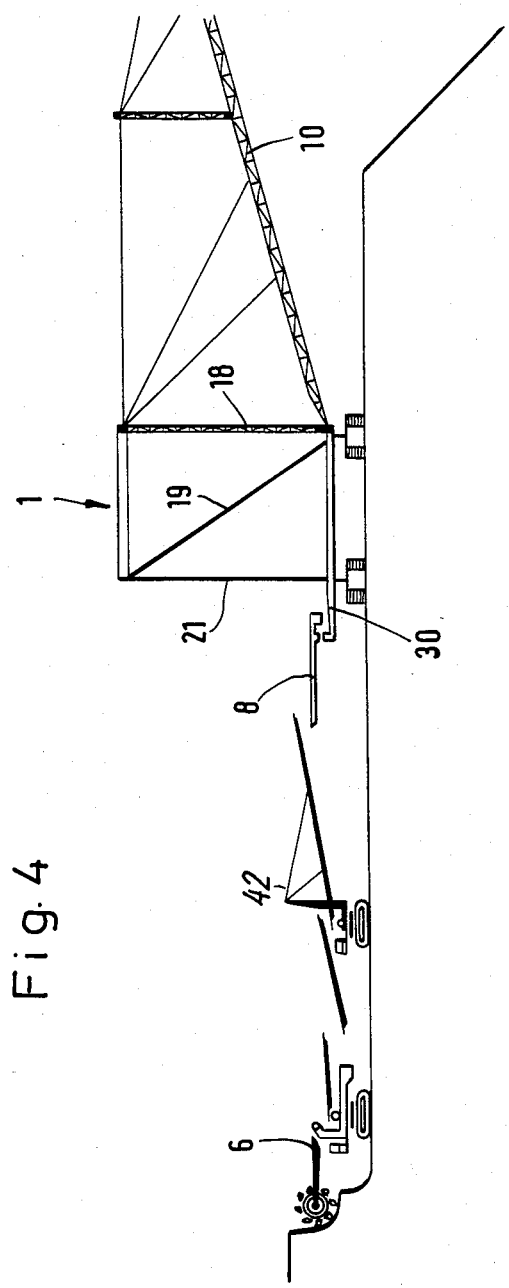
FIG. 4 illustrates the cooperation between the inventive cross-pit conveyor and a compact bucket wheel activator as well as a feed flow equalizer.

FIG. 4 illustrates the same cross-pit conveyor which does cooperate in this case with a single compact bucket wheel exdavator 6, but the latter does not feed directly a feeder conveyor such as 8. Instead, a feeder and feed homogenizer or equalizer 42 is interposed which ensures a continuous homogenic flow of material toward and onto the cross-pit confeyor 1, even though the excavator 6 may operate with such certain degree of intermittancy.

Figure 5:
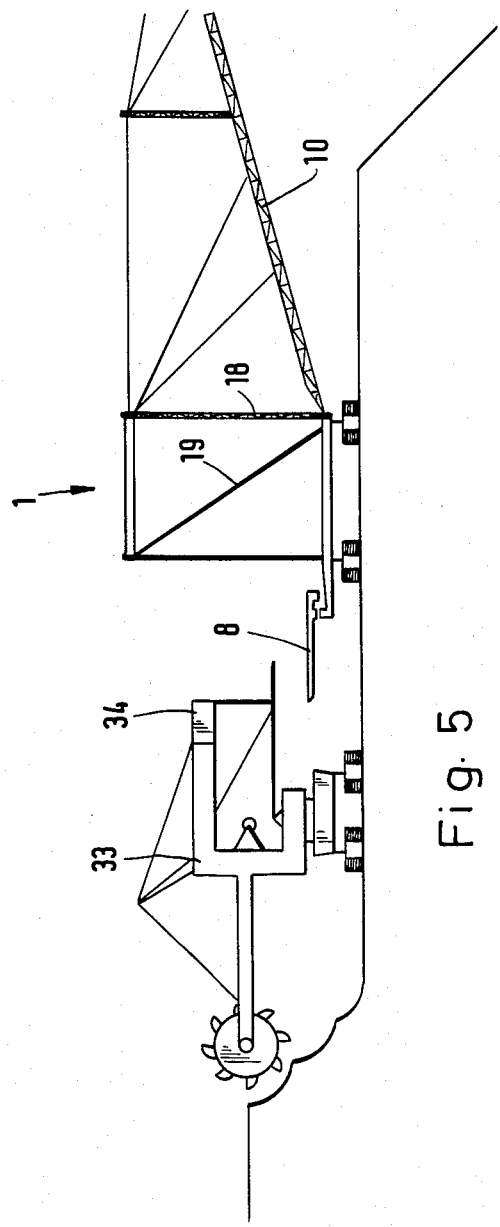
FIG. 5 illustrates the inventive cross-pit conveyor cooperating with a large bucket wheel excavator.

FIG. 5 illustrates the inventive cross-pit conveyor 1 in cooperative relationship with a large-scale bucket wheel excavator 33, having a delivery section 34 which cooperates with, again, a single feeder conveyor belt 8.

The invention is not limited to the embodiments described above; but all changes and modifications thereof, not constituting departures from the spirit and scope of the invention, are intended to be included.

We claim:

1. Cross-pit conveyor for strip-mining operations and cooperating with one or more excavating machines, comprising:
    a pair of struts and a base strut, all arranged and interconnected in a configuration constituting a horizontally oriented isosceles triangle, the struts of the pair constituting the legs and defining the principal corner of the triangle as well as a line of symmetry of the triangle, there being two additional corners at the ends of the base strut;
    a plurality of undercarriage means disposed respectively in the corners of the triangle for movably but separately supporting the struts;
    a first pair of upwardly converging towers, pivotably linked to said base and corners and constituting a first structure;
    a second pair of upwardly converging towers extending from the said base corners but in an inclined fashion, and constituting a second support structure;
    a vertical support tower extending generally upwardly from said principal corner and being on its upper end connected to the ends of the second pair of converging towers;
    tension means interconnecting the first and second pairs of towers at their respective upper ends;
    a boom pivotably linked to said base strut and extending in a direction opposite that principal corner; cable means tensioning the boom in relation to the first pair of towers; and conveyor means extending in and along said boom.

2. Cross-pit conveyor as in claim 1, including additional tension means for tensioning the boom laterally with reference to said base strut corners.

3. Cross-pit conveyor as in claim 2, wherein said additional tension means are cables being anchored to the base strut ends within the axis of pivoting of the first pair of towers and of said boom.

4. Cross-pit conveyor as in claim 1, wherein said tension means are constructed as block and tackle for changing the distance of the top of the first pair of towers from the top of the second pair of towers.

5. Cross-pit conveyor as in claim 1, there being a compression member arranged in a line of symmetry as between that principal corner and the center of said base strut.

6. Cross-pit conveyor as in claim 5, said compression member being constructed as solid wall box element containing electrical equipment.

7. Cross-pit conveyor as in claim 1 wherein said conveyor means extends through said triangle toward said principal corner.

8. A cross-pit conveyor as in claim 7, wherein said conveyor means includes, in the area of the triangle, an acceleration conveyor.

9. Cross-pit conveyor as in claim 1, and including an extension from said principal corner in the direction opposite the extension of said boom, said extension including chute means.

10. Cross-pit conveyor as in claim 9, including a feeder conveyor, pivoted near said principal corner.

11. Cross-pit conveyor as in claim 10, including another feeder conveyor, pivotably linked near said principal corner and in a level different from said first-mentioned feeder conveyor, delivery points of the two feeder conveyors being staggered in direction of said conveyor means.

12. Cross-pit conveyor as in claim 9, including counterweight means at said extension.

13. Cross-pit conveyor as in claim 1, said undercarriage means being pivotably mounted to permit movement of the cross-pit conveyor in any direction.

14. Cross-pit conveyor as in claim 1, wherein said boom is constructed in a lattice frame configuration.

* * * * *